United States Patent [19]
Colby et al.

[11] Patent Number: 5,880,416
[45] Date of Patent: Mar. 9, 1999

[54] AUTOMATIC CALIBRATION OF MOTOR SPEED LOOP GAIN FOR AN ELEVATOR MOTOR CONTROL

[75] Inventors: Roy Stephen Colby, Raleigh, N.C.; Alberto Vecchiotti, Middletown, Conn.

[73] Assignee: Otis Elevator Company, Farmington, Conn.

[21] Appl. No.: 996,262

[22] Filed: Dec. 22, 1997

[51] Int. Cl.$^6$ .............................. B66B 1/28; B66B 1/34; G05B 13/00
[52] U.S. Cl. ........................ 187/393; 187/293; 318/561
[58] Field of Search ................................. 187/393, 391, 187/296, 293; 318/561

[56] References Cited

U.S. PATENT DOCUMENTS

| | | | |
|---|---|---|---|
| 5,476,158 | 12/1995 | Mann et al. | 187/289 |
| 5,495,158 | 2/1996 | Schmidt et al. | 318/561 |
| 5,773,938 | 7/1998 | Seong et al. | 318/6 |

OTHER PUBLICATIONS

M. Depenbrock and N.R. Klaes, *Determination of the Induction Machine Parameters and their Dependencies on Saturation*, Ruhr–University Bochum, Germany, pp. 17–22.

N.R. Klaes, *Parameter Identification of an Induction Machine with Regard to Dependencies on Saturation*, IEEE Transactions on Industry Application, vol. 29, No. 6, Nov. 1993.

A. M. Khambadkone and J. Holtz, *Vector–Controlled Induction Motor Drive with a Self–Commissioning Scheme*, IEEE Transactions on Industrial Electronics, vol. 38, No. 5, Oct. 1991.

J. Holtz and T. Thimm, Identification of the Machine Parameters in a Vector–Controlled Induction Motor Drive, IEEE Transactions on Industry Applications, vol. 27, No. 6 Nov./Dec. 1991.

T. Rowan, R. Kerkman and D. Leggate, A Simple On–Line Adaption for Indirect Field Orientation of an Induction Machine, IEEE Transactions on Industry Applications, vol. 27, No. 4 Jul./Aug. 1991.

R. Kerkman, J. Thunes, T. Rowan and D. Schlegel, A. Frequency–Based Determination of Transient Inductance and Rotor Resistance for Field Commissioning Purposes, IEEE Transactions on Industry Applications, vol. 32, No. 3, May/Jun. 1996.

H. Schierling, Self–Commissioning—A Novel Feature of Modern Inverter–Fed Induction Motor Drives, pp. 287–290.

M. Summer and G. Asher, Autocommissioning for voltage–referenced voltage–fed vector–controlled induction motor drives, IEEE Proceedings, vol. 140, No. 3, May 1993.

Kudor et al, Self–Commissioning for Vector Controller Inductor Motors, IEEE 1993, pp. 528–535.

Tungpimolrut et al, A Direct Measuring Method of Machine Parameters for Vector–Controlled Induction Motor Drives, 1993 IEEE pp. 997–1002.

Green et al, Measurement and On–line Estimation Approaches to a Parameter Variation in Vector Controllers, IEEE Colloq. 1993. pp. 3/1–3/5.

Wade et al, Parameter Identification for Vector Controlled Induction Machines, Heriot–Wat University, UK, pp. 1187–1192.

Bunte et al, Parameter Identification of an Inverter–fed Induction Motor at Standstill with Correlation Method, Universal Paderborn—Germany, The European Power Electronics Association 1993, pp. 97–102.

(List continued on next page.)

*Primary Examiner*—Robert E. Nappi

[57] ABSTRACT

An elevator controller 7 is provided with logic 48 which automatically calculates a motor speed loop gain (J*) of an elevator motor controller 14 by running the elevator up and down while computing an average of a model speed reference signal $W_{MRE}$ for the up/down run and while varying J* and determining the value of J* at which the average of $W_{MRE}$ equals zero within a predetermined tolerance.

7 Claims, 12 Drawing Sheets

OTHER PUBLICATIONS

Wang et al, An Automated rotor time Constant Measurement System for Indirect Field–Oriented Drives, IEEE Transaction on Industry Applications, vol. 24, No. 1, Jan./Feb. 1988.

Lorenz, Tuning of Field–Oriented Induction Motor Controllers for High–Performance Applications, IEEE Transactions on Industry Applications, vol. 1A–22, No. 2, Mar./Apr. 1986.

D. W. Novotny and T.A. Lipo, Vector Control and Dynamics of AC Drives, Oxform Science Publications, pp. 205–251.

DeDoncker et al, The Universal Field Oriented Controller, University of Wisconsin.

Lorenz et al, A control systems Perspective of field oriented Control for AC Servo Drives, University of Wisconsin.

Novotny and Lipo, WEMPEC, Wisconsin Electric Machines and Power Electronics Consortium, Tutorial Report, Chapter 4–1—4–73.

5,880,416

AUTOMATIC CALIBRATION OF MOTOR SPEED LOOP GAIN FOR AN ELEVATOR MOTOR CONTROL

TECHNICAL FIELD

The present invention relates to calibrating an elevator control system and more particularly to automatic calibration of motor speed loop gain for an elevator motor control.

BACKGROUND OF THE INVENTION

It is known that an elevator motion control system may employ motor speed (or velocity) feedback control to achieve desired control of elevator car motion. In such a control system, the motor velocity control comprises a velocity outer loop having a proportional-plus-integral forward path control compensation and a velocity inner loop having proportional (gain) control. The inner velocity loop provides damping to the overall control system.

In order for the performance of the control to provide the desired response, travel time and/or ride quality performance, the inner loop is calibrated to match the characteristics of the elevator and motor being controlled. In particular, it is desirable to match the inner loop gain to the system inertia (J) and the motor torque constant ($K_T$) parameters. However, in modernization or retrofit applications, where a new controller replaces an older controller in an existing elevator system, the inertia and/or torque constant parameters are not always accurately known at the time of installation of the controller. Alternatively, if the weight of the cab changes after drive installation, e.g., by adding or removing fixtures, mirrors, tile, etc., the system inertia changes and the motor/drive system may need to be re-calibrated.

One technique for determining such parameters is to dispatch a field engineer to the site who tunes the elevator controller using special test equipment, e.g., external signal generators and separate torque perturbations. Also, determination of the inertia parameter may be determined by the complex calculation of system weights from contract data which may or may not be accurate at a given job site. Further, in many instances, all the system masses are not accurately known, and thus accurate calculation of system weights is not feasible. However, such techniques are costly, time consuming and, in some cases, inaccurate. As a result, re-calibration of the system is costly and modernization or retrofit applications become unattractive for building owners.

DISCLOSURE OF THE INVENTION

The objects of the invention include provision of an elevator controller that automatically calibrates velocity inner loop gain to match the characteristics of the elevator and motor being controlled.

According to the present invention, a method for calculating a motor speed loop gain of an elevator motor controller includes: a) setting the loop gain to an initial value; b) running the elevator in a first direction; c) calculating a model motor speed (W*); d) calculating a model reference error ($W_{MRE}$) as the difference between the model speed (W*) and an actual motor speed ($\omega_R$); e) running the elevator in a second direction, opposite to the first direction; f) performing steps (c)–(e) during the elevator run in the second direction; g) computing an average value of $W_{MRE}$ for the elevator runs in the first and second directions as $X_{AVG}$; and h) varying J*, performing steps (b)–(g), and determining the value of J* at which $X_{AVG}$ equals zero within a predetermined tolerance.

According further to the present invention, the step of varying (h), comprises: i) varying J* until $X_{AVG}$ changes sign; and j) performing a search algorithm to determine the value of J* at which $X_{AVG}$ crosses through zero, within a predetermined tolerance.

The present invention provides a significant improvement over the prior art by providing automatic on-site calibration (or tuning) of the inner velocity (or speed) loop gain (or inertia) parameter in an elevator control. The invention saves both time and money by enabling elevator installers to determine the correct gain values without extra test equipment and without the need to use field engineers to tune the elevator control system. This is especially important in modernization applications where a new controller replaces an older controller in an existing elevator system, where the inertia and torque constant parameters are not known in advance from factory data. Also, the present invention may be used with either AC or DC drives that use the velocity control described herein. Further, the invention does not require external signal generators or separate torque perturbations to identify the system parameters. Still further, the present invention allows existing elevator motion control and safety systems to remain in place throughout the calibration procedure of the present invention.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

Figure 1:
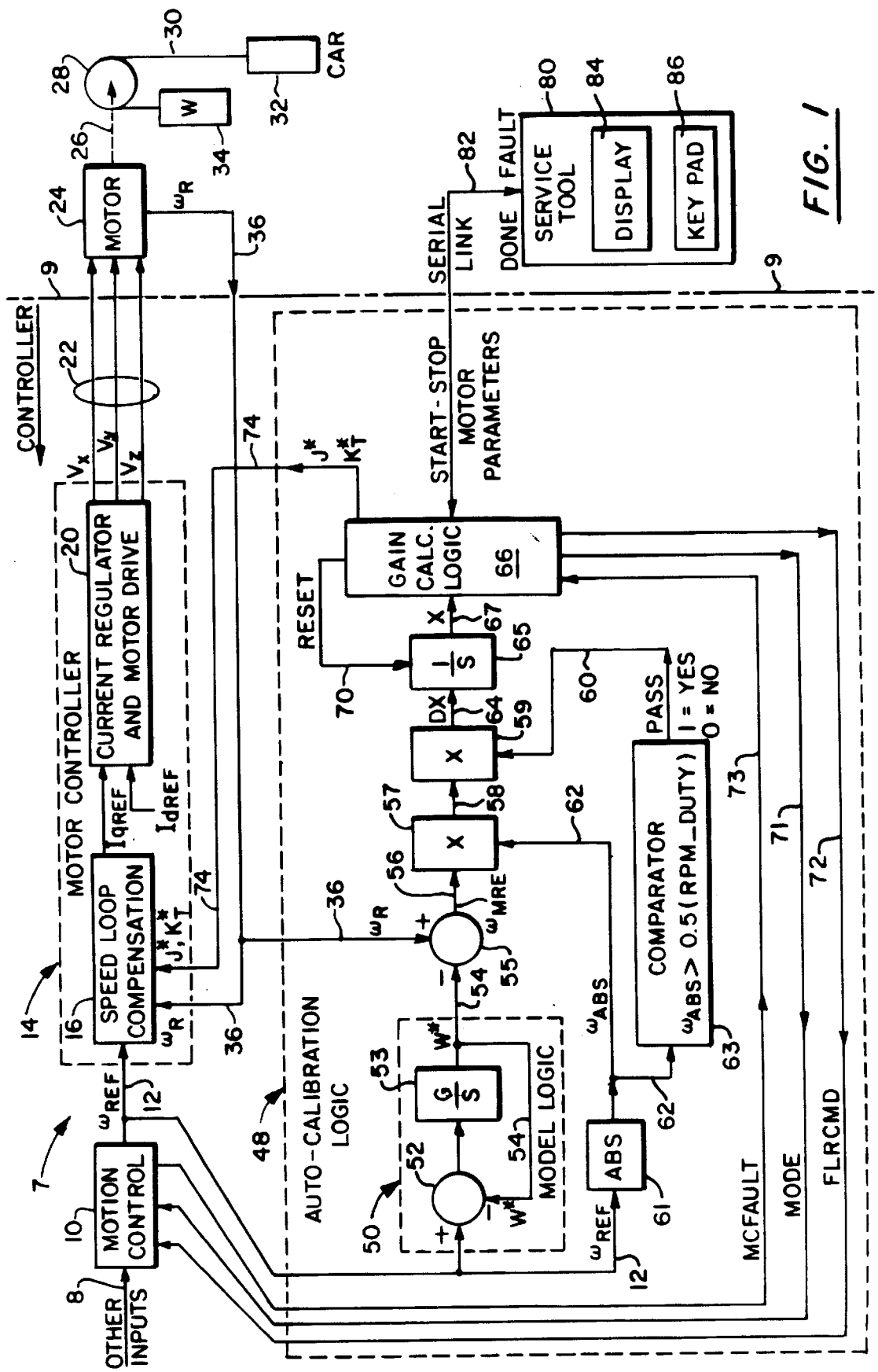
FIG. 1 is a block diagram of an elevator controller having auto-calibration logic, in accordance with the present invention.

Referring to FIG. 1, that shown to the left of the line 9 is a portion of an elevator controller 7, which includes a motion control circuit 10 which receives floor destination commands from an operational controller (not shown) on a line 8 and provides a speed reference $\omega_{REF}$ (typically in the form of a speed profile) on a line 12 to a motor controller 14. The elevator controller 7 comprises known electronic components (e.g., a microprocessor) and/or software capable of performing the functions described herein.

The motor controller 14 comprises speed loop compensation logic 16 which provides closed loop control of motor speed $\omega_{REF}$ and comprises one or more control loops, such as a proportional-plus-integral outer loop control and a proportional inner loop control shown in the control system block diagram of FIG. 2 described hereinafter.

The speed loop compensation logic 16 provides a q-axis current reference $I_{qREF}$ on a line 18 to known field-oriented current regulator/motor drive circuit 20. The circuit 20 also receives a constant d-axis current reference $I_{dREF}$ on a line 19. The circuit 20 provides closed loop P-I control of two currents Id, Iq, one for the d-axis current Id and one for q-axis current Iq, respectively. The circuit 20 comprises logic which converts from d-axis and q-axis control parameters to three phase drive parameters $V_X$, $V_Y$, $V_Z$, measures the individual phase currents and converts the phase currents to d-axis and q-axis parameters to close the loop on the currents Id, Iq. The circuit 20 also comprises a known drive circuit (or inverter) which provides pulse-width-modulated, variable frequency, 3-phase drive voltages $V_X$, $V_Y$, $V_Z$ on lines 22 to a motor 24, e.g., a three phase induction motor. The phase voltages need not be pulse-width modulated. The circuit 20 is similar to that described in Copending U.S. patent application, Ser. No. (Otis Docket No. OT-4046), filed contemporaneously herewith.

The type of drive and drive signals used is not critical to the present invention. Accordingly, any type of AC or DC drive that provides a drive current to the motor indicative of the reference current may be used. Also, the drive need not be field-oriented.

Two examples of three phase AC induction motors which may be used with the present invention are, Model LUGA-225LB-04A, by Loher, having a rated power of 45 KW, rated voltage of 355 volts, rated speed of 1480, and rated frequency of 50 Hz, in a geared configuration; and Model 156MST, by Tatung (of Taiwan), having a rated power of 40 KW, rated voltage of 500 volts, rated speed of 251, and rated frequency of 16.7 Hz, in a gearless configuration. Other motors having other rated parameters may be used if desired.

The motor 24 provides a speed feedback signal $\omega_R$ (or $\omega_{FB}$) indicative of the rotational speed (or velocity) of the motor 24 on a line 36 to the speed loop compensation 16 of the motor controller 14. The motor 24 is connected by a mechanical linkage 26, e.g., a shaft and/or a gearbox, to a sheave 28. A rope or cable 30 is wrapped around the sheave 28 and has one end connected to an elevator car 32 and the other end connected to a counterweight 34. The weight of the counterweight is typically equal to the empty car weight plus 40–50% of the rated load for the car.

Other elevator system configurations, and with or without a counterweight, with or without a gearbox, may be used if desired to convert the output torque of the motor 24 to movement of the elevator cab 32, such as dual lift (where two elevator cars are connected to a single rope, the cars move in opposite directions and each car provides a counterweight for the other car), drum machine (where the rope is wrapped around a drum driven by a motor), etc.

The present invention provides auto-calibration logic 48 to the elevator controller 7 to provide automatic on-site calibration of the inner loop gain J* to the characteristics of the elevator and motor system being controlled. The logic 48 comprises known electronic components, which may include a microprocessor, interface circuitry, memory, software, and/or firmware, capable of performing the functions described herein.

In particular, the auto-calibration logic 48 comprises model logic 50 which models the transfer function of the desired closed outer loop transfer function of the motor controller and plant (as discussed hereinafter with FIGS. 2–4). The logic 50 comprises a summer 52 which receives $\omega_{REF}$ on the line 12 at the positive input of the summer 52 and receives an estimated speed value W* on a line 54 at a negative input of the summer 52. The output of the summer 52 is fed to an integrator 53 (G/s) with a gain G.

The output of the logic 50 is the model (or estimated) speed signal W* provided on the line 54 to a negative input of a summer 55. The speed feedback signal $\omega_R$ (or $\omega_{FB}$) from the motor 24 on the line 36 is fed to the positive input of the summer 55. The output of the summer 55 is a model reference error signal $W_{MRE}$ on a line 56 indicative of the difference between the actual motor speed $\omega_R$ and the model motor speed W* from the model logic 50. The signal $W_{MRE}$ is fed to a multiplier 57. The speed reference signal $\omega_{REF}$ on the line 12 is fed to an Absolute Value Circuit 61 (ABS) which provides an absolute value signal $W_{ABS}$ on a line 62 indicative of the absolute value of $\omega_{REF}$ which is fed to the multiplier 57. The multiplier 57 multiplies $W_{MRE}$ by the absolute value of the speed reference signal $\omega_{REF}$ on the line 62.

The output of the multiplier 57 is provided on a line 58 to a multiplier 59, which multiplies the signal on the line 58 by a Pass signal on a line 60. The purpose of the multipliers 57, 59 is discussed hereinafter. The polarity of the summer 55 inputs may be reversed.

The absolute value signal $W_{ABS}$ on the line 62 is also fed to a comparator 63 which provides the Pass signal. When the signal $W_{ABS}$ is greater than one half of the full (or contract or duty) running speed of the motor RPM_Duty, e.g., RPM_Duty=700 rpm, the output signal Pass on the line 60 is one. Conversely, if the speed signal $W_{ABS}$ is less than half of the full speed RPM_Duty, the output signal Pass from the comparator 63 is zero. The f all speed RPM_Duty depends on the target application and may be 700 rpm, 1400 rpm, or other speeds as appropriate. The value for RPM_Duty may be provided by service personnel over the link 82 from the service tool 80.

The output of the multiplier 59 is a signal DX on a line 64. When Pass equals one, the signal DX is equal to the signal on the line 58 and when the Pass signal equals zero, DX equals zero. The signal DX on the line 64 is fed to an integrator 65 which provides an output signal X on a line 67 to gain calculation logic 66. The logic 66 contains known electronics and/or software capable of performing the functions described herein (discussed more hereinafter with FIG. 5).

Also, the gain calculation logic 66 provides an integrator reset signal on a line 70 to the integrator 65. The logic 66 also provides MODE signal and a floor command signal FLRCMD on lines 71, 72, respectively, to the motion controller 10. The MODE signal causes the motion controller 10 to accept floor commands from the FLRCMD signal on the line 72.

The FLRCMD signal commands the motion controller 10 to perform an elevator run in a commanded direction for a commanded number of floors time (or to a particular floor) which corresponds to running the elevator for a predetermined time using a standard predetermined speed profile in the motor control 10, discussed more hereinafter. The motion control logic 10 also provides a motor controller fault signal MCFAULT on a line 73 to the logic 66 to indicate if a fault has occurred during an elevator run. The logic 66 also provides an estimated value of J* and $K_T^*$ on lines 74 to the speed loop compensation logic 16 of the motor controller 14.

The calculation logic 48 also communicates with a service tool 80 over a serial link 82. The service tool 80 includes a display 84 and a keypad (or keyboard) 86 for entering data into the service tool 80 and over the link 82 to the controller 7. In particular, the logic 48 receives a Start command and a Stop command over the link 82 from the service tool 80, which controls when auto-calibration is started and stopped (or aborted), respectively. Also, the logic 66 receives parameters necessary for the auto-calibration logic to compute the values of J* and $K_T^*$ (discussed more hereinafter). The logic 66 provides a DONE signal and a FAULT signal to the service tool 80 over the link 82. The DONE signal indicates when auto-calibration has completed without any faults and the FAULT signal indicates when a fault has been detected during auto-calibration.

The elevator motion commands (destination floors) may be entered manually using the service tool 80, or, alternatively, the elevator may be set up to cycle between two predetermined floors using the service tool 80. Also, to simplify implementation and maximize safety, all motion of the elevator may be under control of the normal elevator control systems and all normal hoistway safety functions may be in effect.

The logic 66 monitors the signal X on the line 67 and after each elevator run. If the value of X is not within a predetermined threshold, it calculates a new value for J* and commands another elevator up/down run. The logic 66 iterates the value of J* until the value is within predetermined tolerance and thereby obtains a tuned system, discussed more hereinafter.

Figure 2:
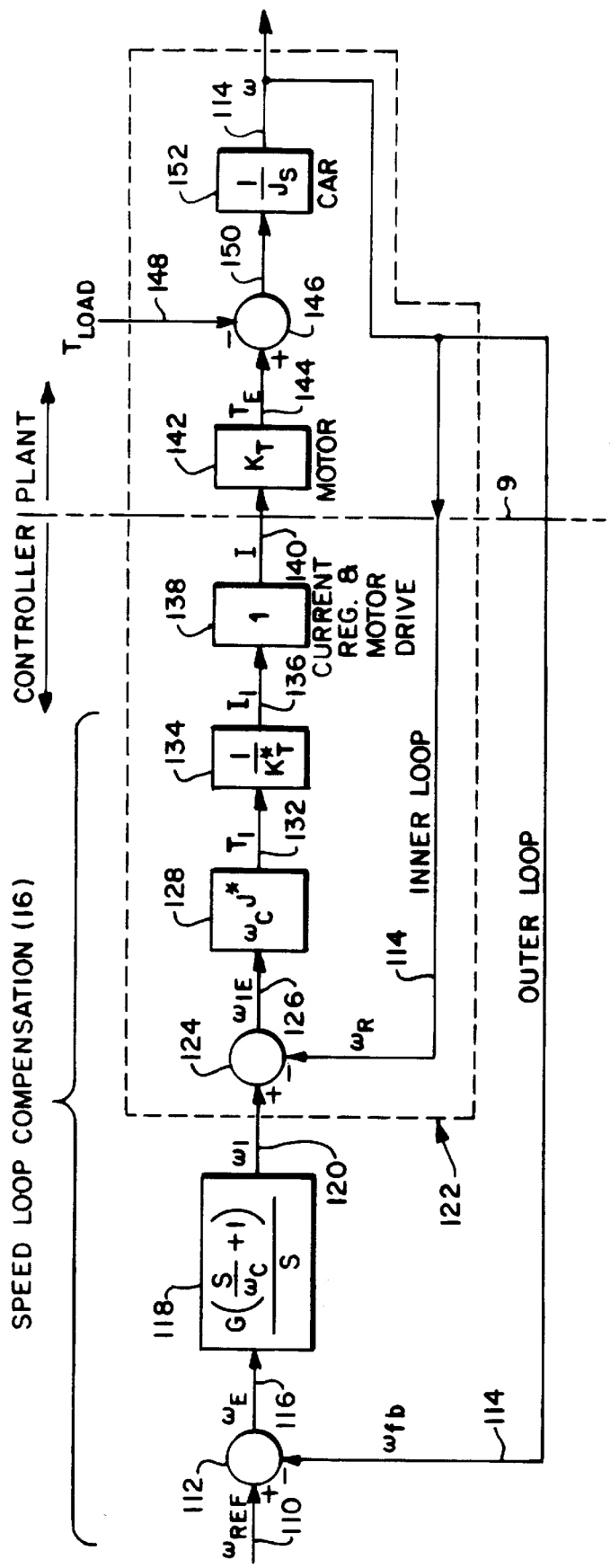
FIG. 2 is a control system block diagram model of a portion of the controller of FIG. 1, in accordance with the present invention.

Referring to FIG. 2, a control system block diagram equivalent diagram of a speed control loop comprising the motor controller 14, the motor 24 and the elevator system components connected to the motor (FIG. 1), is shown. Various portions of the control system of FIG. 2 may be analogized to the portions of the schematic block diagrams of FIG. 1. In particular, the control system of FIG. 2 comprises the speed reference signal $\omega_{REF}$ on a line 110 (analogous to the line 12 of FIG. 1) from the motion control logic 10. The speed feedback signal $\omega_R$ on a line 114 is fed to the negative input of the summer 112. The summer 112 provides an error signal $W_E$ on a line 116 to outer loop forward path compensation 118 which comprises known proportional-plus-integral control logic having the following transfer function:

$$\frac{G(s/\omega_C + 1)}{s} \qquad \text{Eq. 1}$$

where G is the outer open loop gain, $\omega_C$ is the break frequency for the numerator lead and "s" is the known Laplace transform operator.

The output of the compensation logic 118 is a signal $W_1$ provided on a line 120 which is a reference to an inner speed control loop 122. The inner loop speed reference $W_1$ is fed to a positive input of a summer 124. The speed feedback signal $\omega_R$ on the line 114 is fed to the negative input of the summer 124. The output of the summer 124 is an inner loop error signal $W_{1E}$ on a line 126 which is fed to a multiplier 128 which multiplies $W_{1E}$ by constants $\omega_C \times J^*$, where J* is the estimated system inertia. The output of the multiplier 128 is a torque signal $T_1$ on a line 132 provided to a multiplier 134 which multiplies the signal $T_1$ by $1/K_T^*$, where $K_T^*$ is the estimated motor torque constant. The output of the multiplier 134 is a current command $I_1$ on a line 136. The current command $I_1$ is provided to a block 138 indicative of the transfer function of the current regulator/motor drive 20 (FIG. 1) which has a transfer function of 1, in the frequency range of interest for the present invention.

The drive 138 provides a drive current I on a line 140 to a block 142 representing a current-to-torque multiplier (or torque constant $K_T$) of the motor 24 (FIG. 1). The torque constant $K_T$, as is known, is the ratio of motor torque to motor current. The motor 24 is a three-phase induction motor but may be any type of motor having a torque constant. For a field-oriented controlled induction motor, the current I represents the reference q-axis vector current $I_{qREF}$. The output of the multiplier 142 is the motor output torque $T_E$ on a line 144, which is provided to a positive input of a summer 146. The negative input to the summer 146 is a signal $T_{LOAD}$ on a line 148 indicative of additional external load disturbances on the elevator cab system, such as friction or a load imbalance between the car and counterweight. The output of the summer 146 is provided on a line 150 to a block 152 indicative of dynamics of the elevator inertia J, which is modeled as an integrator 1/Js with a gain 1/J. The output of the block 152 on the line 114 is the rotational speed $\omega_R$ (or $\omega^{FB}$) of the motor 24 (FIG. 1). The numerals 112–134 illustrates the control logic within the speed loop compensation logic 16 (FIG. 1).

Figure 3:
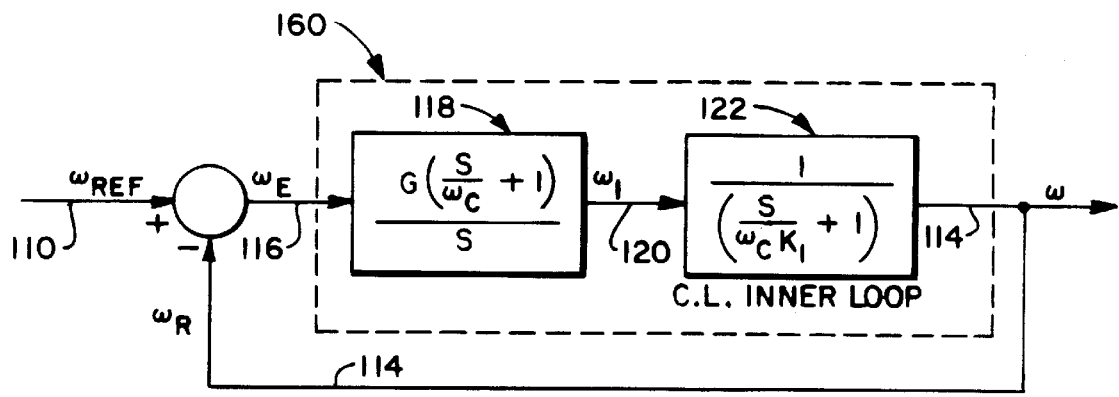
FIG. 3 is a simplified control system block diagram of the system of FIG. 2, in accordance with the present invention.

Referring to FIG. 3, the block diagram of FIG. 2 can be simplified by expressing the inner loop 122 as a closed loop transfer function indicated by the below equation:

$$\frac{1}{(s/\omega_C K_1 + 1)} \qquad \text{Eq. 2}$$

where $K_1 = (J^*/K_T^*) \times (K_T/J)$. Thus, the closed inner loop transfer function is a first order lag having a break frequency at $\omega_C K_1$.

Figure 4:
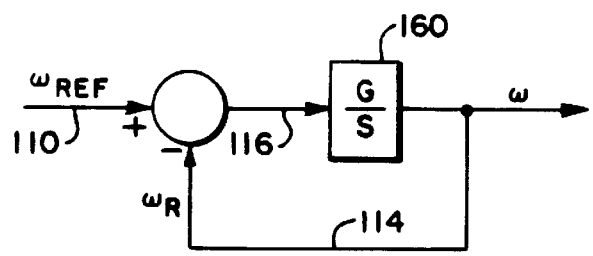
FIG. 4 is a simplified control system block diagram of the system of FIG. 3, in accordance with the present invention.

Referring to FIG. 4, if the constant $K_1$ is equal to 1, the numerator (lead) of the outer open loop transfer function 118 matches and cancels with the denominator (lag) of the inner closed loop transfer function 122. The resultant transfer function 160 is an integrator (G/s) having a gain G. We have found that when $K_1=1$, the elevator/motor system exhibits a desirable response.

Figure 5:
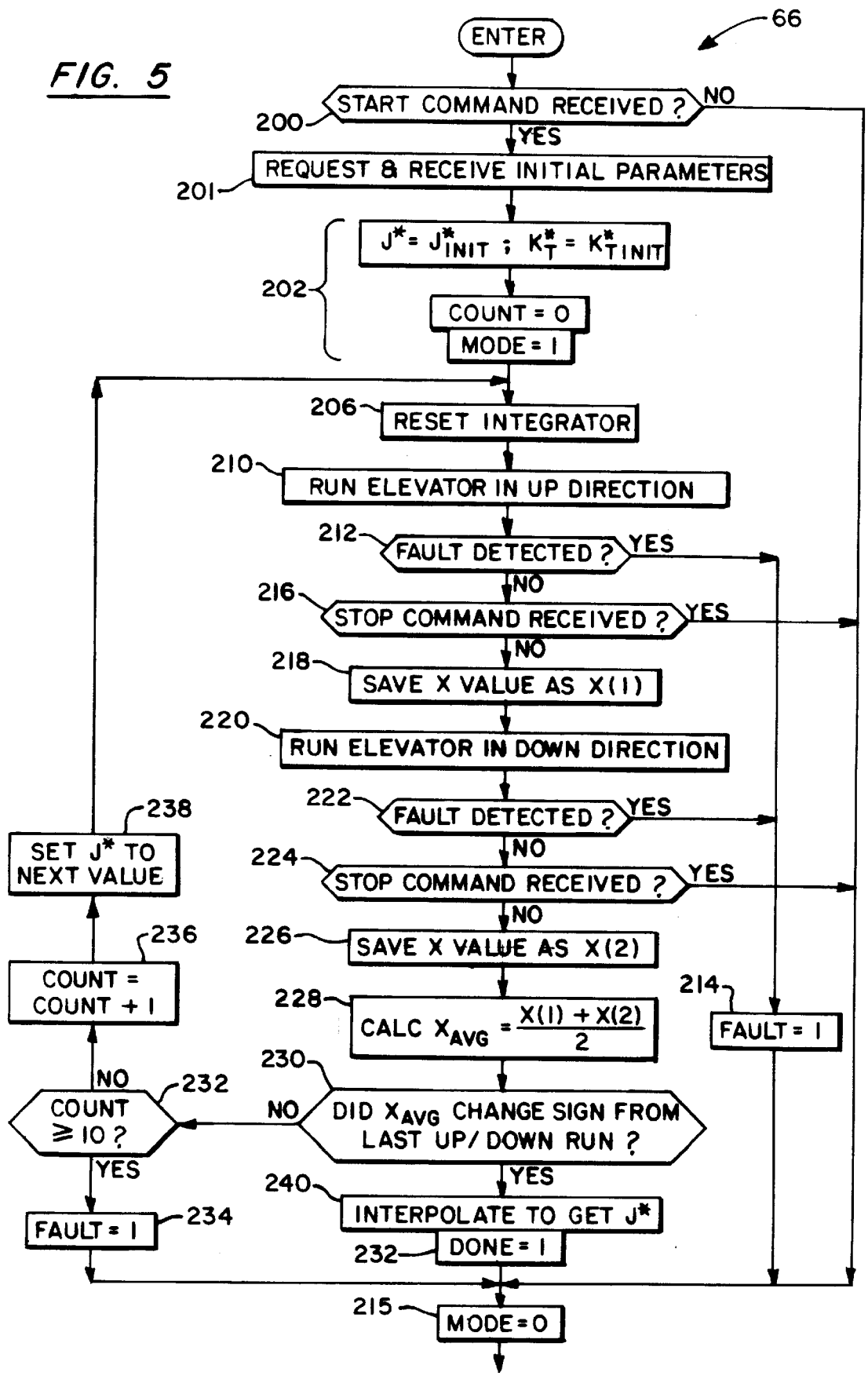
FIG. 5 is a logic flow diagram of a portion of the auto-calibration logic, in accordance with the present invention.

Referring to FIG. 5, a flow diagram for the gain calculation logic 66 begins at a step 200, which checks whether a start command has been received from the service tool 80 (FIG. 1). If a start command has not been received, the logic 66 exits. If a start command has been received, a step 202 requests and receives the necessary parameters to perform the auto-calibration logic 48, such as $J^*_{INIT}$, $K_T^*_{INIT}$ from the service tool 80.

The parameter $K_T^*{}_{INIT}$ may be obtained from a previously calculated motor test, such as that described in Copending U.S. patent application, Ser. No. (Otis Docket No. OT-3064). The values for the parameter $J^*{}_{INIT}$ may be approximated as shown below, and an alternative to receiving $K_T^*{}_{INIT}$ from a previous motor test is to approximate it as shown below:

$$J^*{}_{INIT}=2.0+6.0\times Load\_Duty\times((RPM\_Duty*60)/RPM\_Rated)^2 K_T^*{}_{INIT}=T_{RATED}/(I_{FULL-LOAD}^2-I_{NO-LOAD}^2)^{1/2}$$

where $T_{RATED}$ is the rated torque from the motor data sheet, $I_{FULL-LOAD}$ is the full load motor current from the motor data sheet, $I_{NO-LOAD}$ is the no load motor current from the motor data sheet, RPM_Duty is the contract or duty or max speed the motor is run for the application, Load_Duty is the duty or max load for the elevator for the application, RPM_Rated is the rated motor speed from the motor nameplate. In that case, the service personnel may calculate the parameters $J^*{}_{INIT}$, $K_T^*{}_{INIT}$ and provide them to the logic 66 by the service tool 80. Alternatively, the service personnel may provide the parameters Load_Duty, RPM_Duty, RPM_Rated, $I_{FULL-LOAD}$, $I_{NO-LOAD}$, $T_{RATED}$ to the logic 66 by the service tool 80, and the logic 66 calculates the parameters $J^*{}_{INIT}$, $K_T^*{}_{INIT}$ at the step 201. Other values for the initial parameters $J^*{}_{INIT}$, $K_T^*{}_{INIT}$ may be used if desired; however, the values chosen for $J^*{}_{INIT}$, $K_T^*{}_{INIT}$ will determine how $J^*$ is adjusted (discussed more hereinafter). Other techniques may be used to obtain the initial parameters necessary to carry out the present invention.

Next, a series of steps 202 sets $J^*$ and $K_T^*$ to the initial values $J^*{}_{INIT}$, $K_T^*{}_{INIT}$, respectively, sets Count=0 to clear the loop counter, and sets MODE=1. Next, a step 206 resets the integrator 65 (FIG. 1) output to zero.

Next, a step 210 sets the FLRCMD signal to run the elevator in the UP direction, using the standard speed profile discussed hereinafter.

The floor where the elevator is initially positioned will determine which direction the elevator will be run.

After the elevator up/down run is complete (as well as during the elevator run), a step 212 determines whether a fault has occurred during the run of the elevator by reading the MCFAULT signal on the line 73 (FIG. 1). If a fault has been detected, a step 214 sets the FAULT signal equal to 1 which is sent over the link 82 to the service tool 80.

If a fault has not been detected during the run of the elevator, the logic 66 checks whether a stop command has been received from the service tool 80 in a step 216. If a stop command has been received, the a step 215 sets MODE=0 the logic exits, and the auto-calibration procedure aborted. If the stop command has not been received, the logic reads the signal X on the line 67 (FIG. 1) and saves it as a variable X(1) in a step 218.

Next, a step 220 runs the elevator in the DOWN direction (opposite to the run in the step 210), using the standard speed profile discussed hereinafter. When the elevator up/down run is completed (as well as during the run), a step 222 checks if a fault has occurred during the elevator run by monitoring the MCFAULT signal. If it has, the step 214 sets the FAULT signal equal to 1 (FIG. 1), which is sent to the service tool 80 over the link 82, the step 215 sets MODE=0, and the logic 66 exits. If a fault has not been detected, a step 224 checks whether a Stop command has been received from the service tool 80. If a stop command has been received, the step 215 sets MODE=0, the logic exits and the auto-calibration procedure is aborted. If not, a step 226 saves the value of X as a variable X(2). The Up/Down run order may be reversed if desired.

Next, a step 228 calculates the average X value of the up/down run as: $X_{AVG}=[X(1)+X(2)]/2$. Then, $X_{AVG}$ is checked at a step 230 to see if it has changed sign (or polarity) from the last up/down run. If it has not changed sign, a step 232 checks whether Count is greater than or equal to 10 iterations. If the loop has iterated less than ten times, a step 234 sets the Fault flag to one and sends it to the service tool 80 over the link 82 (FIG. 1). If not, a step 236 increments Count by one and a step 238 calculates the next value of $J^*$. For example, if $J^*{}_{INIT}$ is set high as discussed hereinbefore, $J^*$ is reduced by a predetermined amount, e.g., 20% or $J^*(n+1)=J^*(n)\times 0.8$, at the step 238 and the logic 66 goes back to the step 206 to perform another up/down run of the elevator. Other percentage changes for $J^*$ may be used. Conversely, if $J^*{}_{INIT}$ is set low, $J^*$ is increased by a predetermined amount in the step 238.

Figure 12:
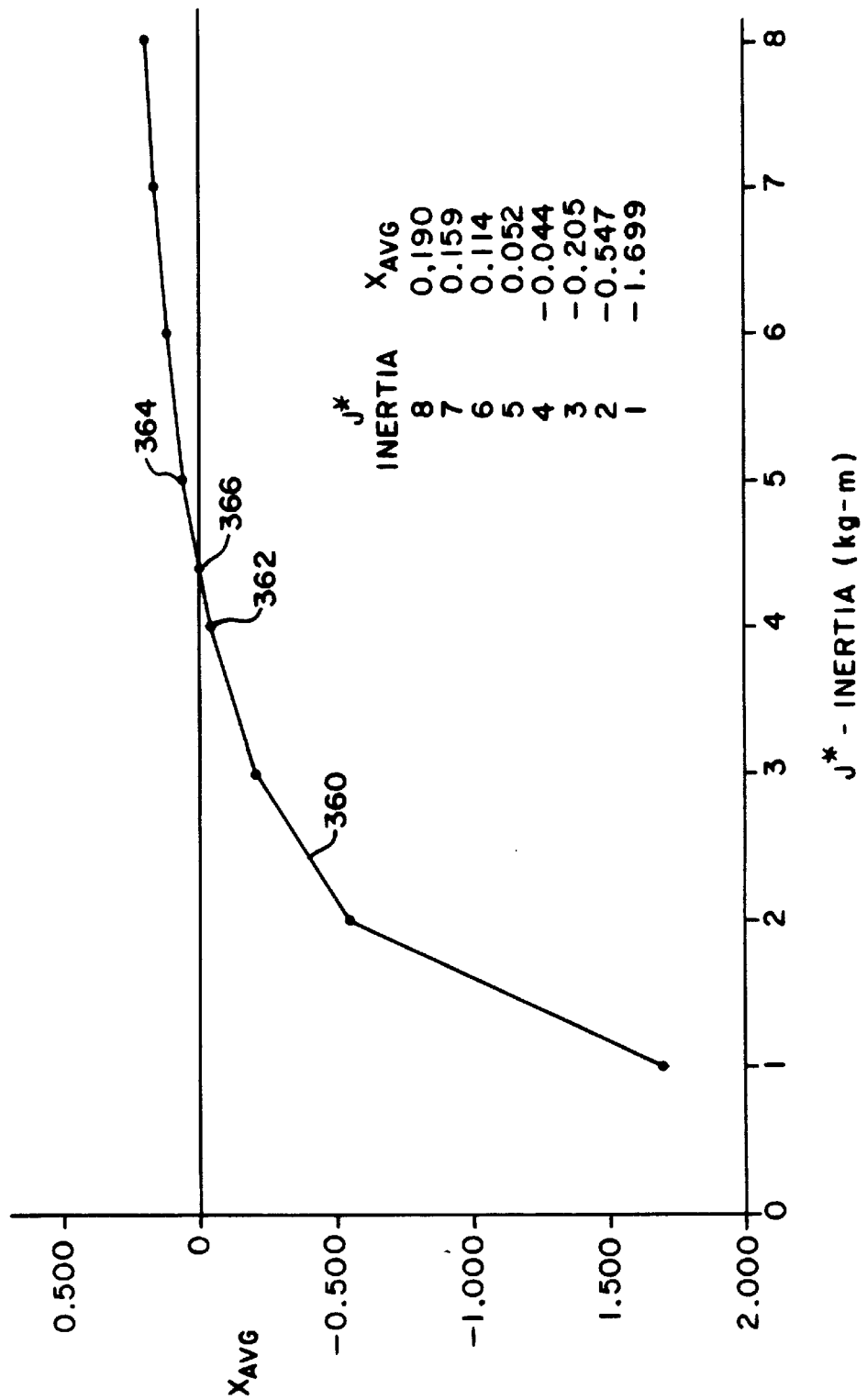
FIG. 12 is a graph of $X_{AVG}$ versus estimated inertia (J*) for various values of J*, in accordance with the present invention.

If $X_{AVG}$ has changed sign, the result of the test 230 will be yes and a step 240 interpolates to determine the value of $J^*$ where $X_{AVG}$ crosses zero. In particular, referring to FIG. 12, a curve 360 shows the values of X plotted for given estimated set of values of $J^*$. When the value of X crosses through zero, the values of $J^*$ associated with the data points 362, 364 on both sides of zero are interpolated to determine the point 366 at which the curve 360 crosses through zero. The result of this interpolation is the approximated value for the system inertia $J^*$ which will be used by the motor controller 8 (FIG. 1).

Figure 13:
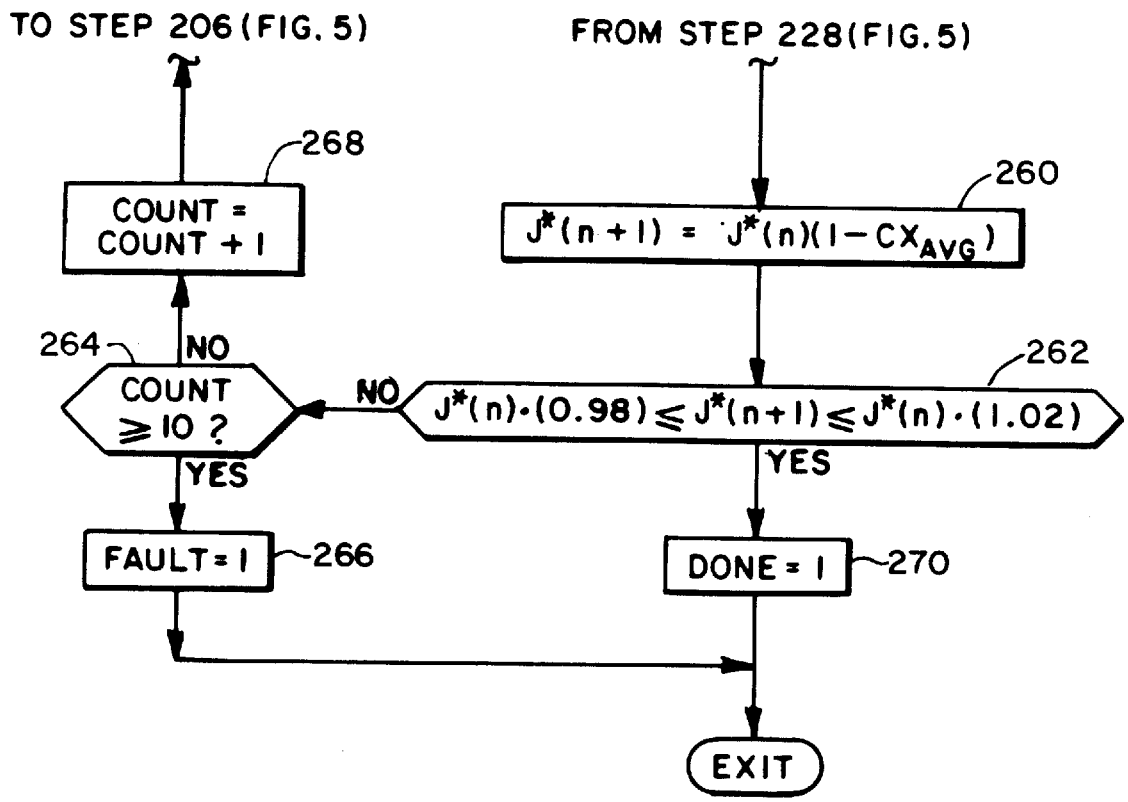
FIG. 13 is an alternative top-level flow chart of a portion of the logic of FIG. 5, in accordance with the present invention.

Referring to FIG. 13, an alternative search algorithm for $J^*$ for the logic 66 after the step 228 in FIG. 5 comprises a step 260 which calculates the next value of $J^*$ by the equation:

$$J^*(n+1)=J^*(n)[1-CX_{AVG}] \qquad \text{Eq. 3}$$

where C is a positive constant factor which controls the rate of convergence in the gain adjustment, e.g., C=1 to 2. Using this algorithm, when $X_{AVG}$ is positive, $J^*$ is adjusted downward, and when it $X_{AVG}$ is negative $J^*$ is adjusted upward. Next, a step 262 tests whether the value of $J^*$ is within 2% of the previous value of $J^*$. If not, a test 264 checks whether Count is greater than or equal to 10. If the result of test 264 is yes, the maximum allowed number of iterations have occurred and a step 266 sets the Fault flag to one which is sent to the service tool 80 over the link 82. If the result of the test 264 is no, a step 268 increments Count by one and the logic goes to step 206 (FIG. 5) to perform another up/down elevator run. If in step 262 $J^*$ is within 2% of the previous value, the adjustment algorithm is deemed to have converged to the correct value, and a step 270 sets the DONE=1 and sends it to the service tool 80 over the link 82, the step 215 sets MODE=0, and the logic exits.

Other gain adjustment algorithms for the logic 66 may be used if desired, provided the algorithm converges to the correct value of $J^*$ within the desired tolerances. Also, the logic described herein may be performed using values of X from only an up or down run (i.e., without averaging); however, averaging X from up and down runs provides the most robust values for $J^*$.

Referring now to FIGS. 6–11, the parameters of the model of FIGS. 2–4 are set as follows: $J^*$=4.0 (high); 1.0 (low); 2.28 (correct). $K_T^*$=2.44, $K_T$=2.44, J=2.28, G=8, $\omega_C$=4. Plugging these values into the previous equation for K1, give K1=$J^*$/2.28, which when evaluated at $J^*$=1, 4.0, 2.28, yields K1=0.44, 1.75, 1, respectively.

Figure 6:
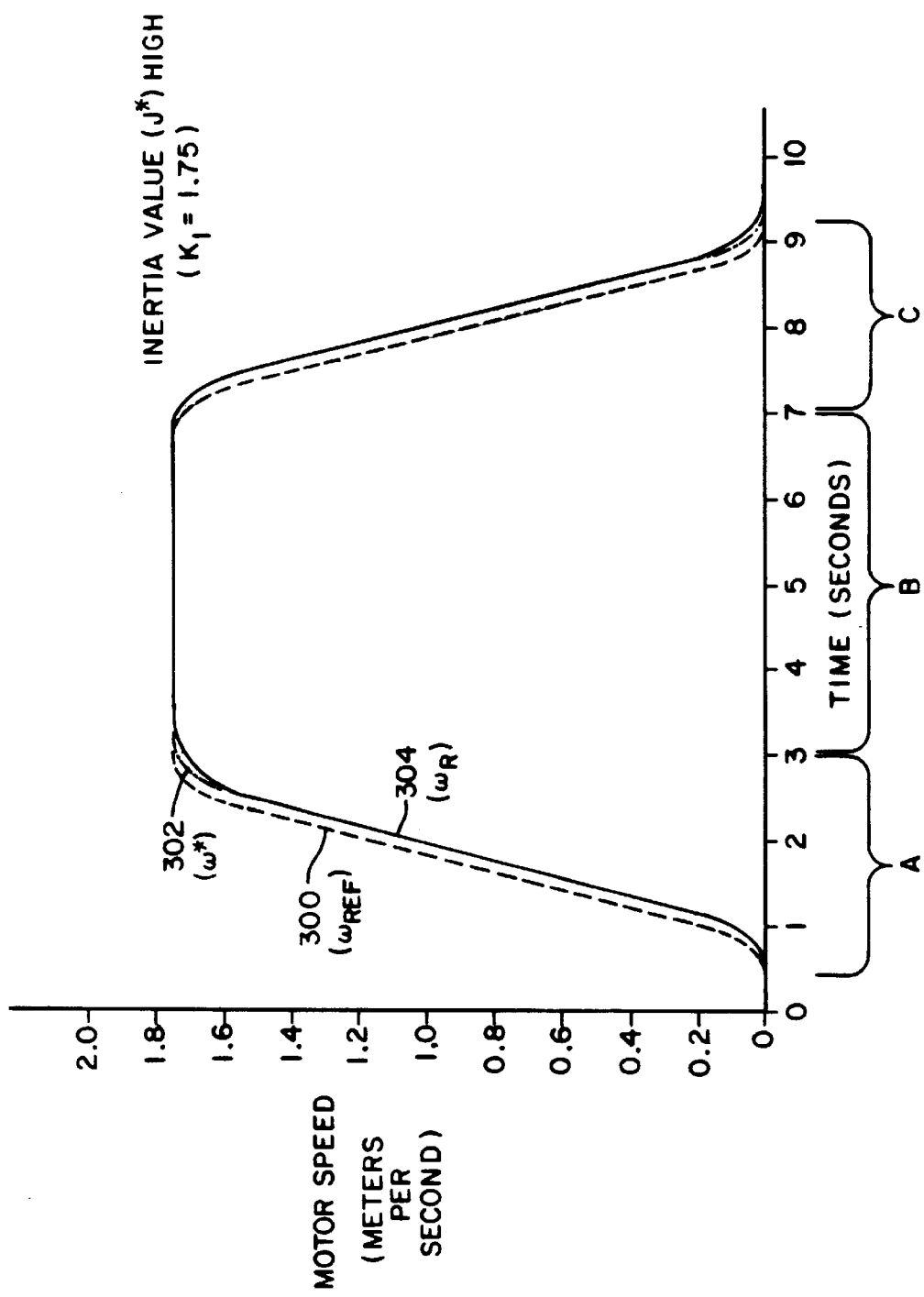
FIG. 6 is a graph of three motor speed parameters versus time when the inner loop gain estimate is high, in accordance with the present invention.

Referring to FIG. 6, the reference signal $W_{REF}$, the output of the ideal model 50 (FIG. 1) $W^*$, and the actual speed of the motor $\omega_R$ (or $\omega_{FB}$) are indicated by the curves 300, 302, 304, respectively. The speed profile reference curve 300

($\omega_{REF}$) is indicative of a typical speed profile for the elevator comprising a ramp-up (or increasing or acceleration) speed region A, a constant speed region B (where the motor runs at the duty or contract or full speed for a given application) and a ramp down (or decreasing or deceleration) speed region C back to zero.

The duration of the constant speed portion B is based on the number of floors (or destination floor) commanded by the FLRCMD signal (FIG. 1). The duration of the constant speed portion B is not critical to the present invention to determine J*. However, the acceleration and deceleration regions A, C of the speed profile provide information to determine the correct value of J*. Also, the higher the speed, the better the measurements for J*; thus, the elevator is run up to duty speed.

The profile 300 is merely for illustration purposes and other ramp up/down rates, duty speeds, and overall profiles may be used. Similar regions A, B, C exist for the speed reference curves 320, 340 of FIGS. 8 and 10. The number of floors or destination floor may be provided by the service tool 80 over the link 82.

Referring to FIG. 6, when the inertia value is high, e.g., J=4.0 and thus, K1=1.75, it is seen that the actual motor speed response curve 304 will exhibit a sluggish response.

Figure 7:
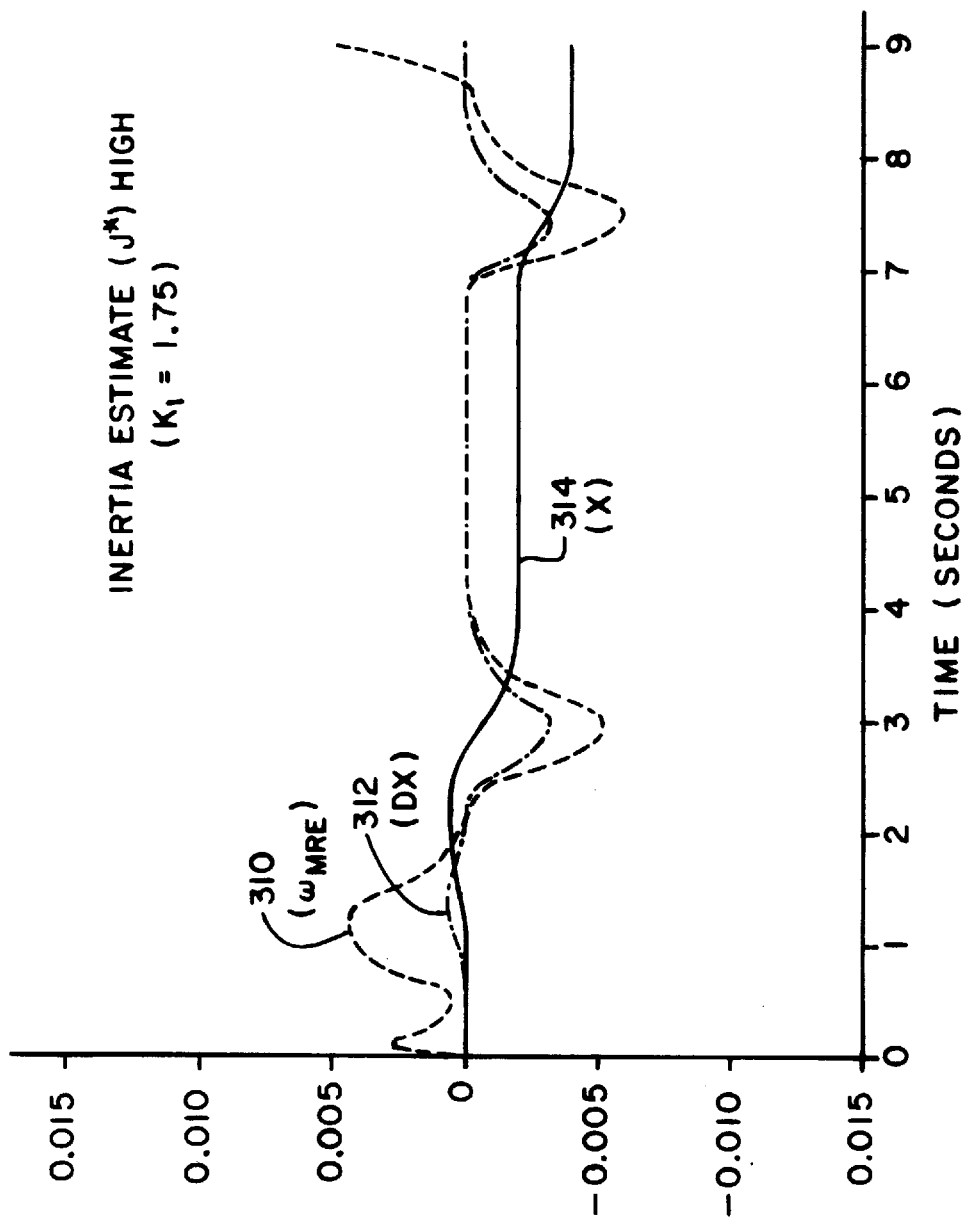
FIG. 7 is a graph of three parameters in the auto-calibration logic of FIG. 5 versus time when the inner loop gain estimate is high, in accordance with the present invention.

Referring to FIG. 7, the signals $W_{MRE}$ on the line 56 (FIG. 1), the signal DX on the line 64 (the input to the integrator 65) and the signal X (the output of the integrator 65) are indicated by curves 310, 312, 314, respectively, for when the inertia estimate J* in the controller 8 is high (J*=4.0; K1=1.75). In this case, the value of X is negative at the end of the run.

Figure 8:
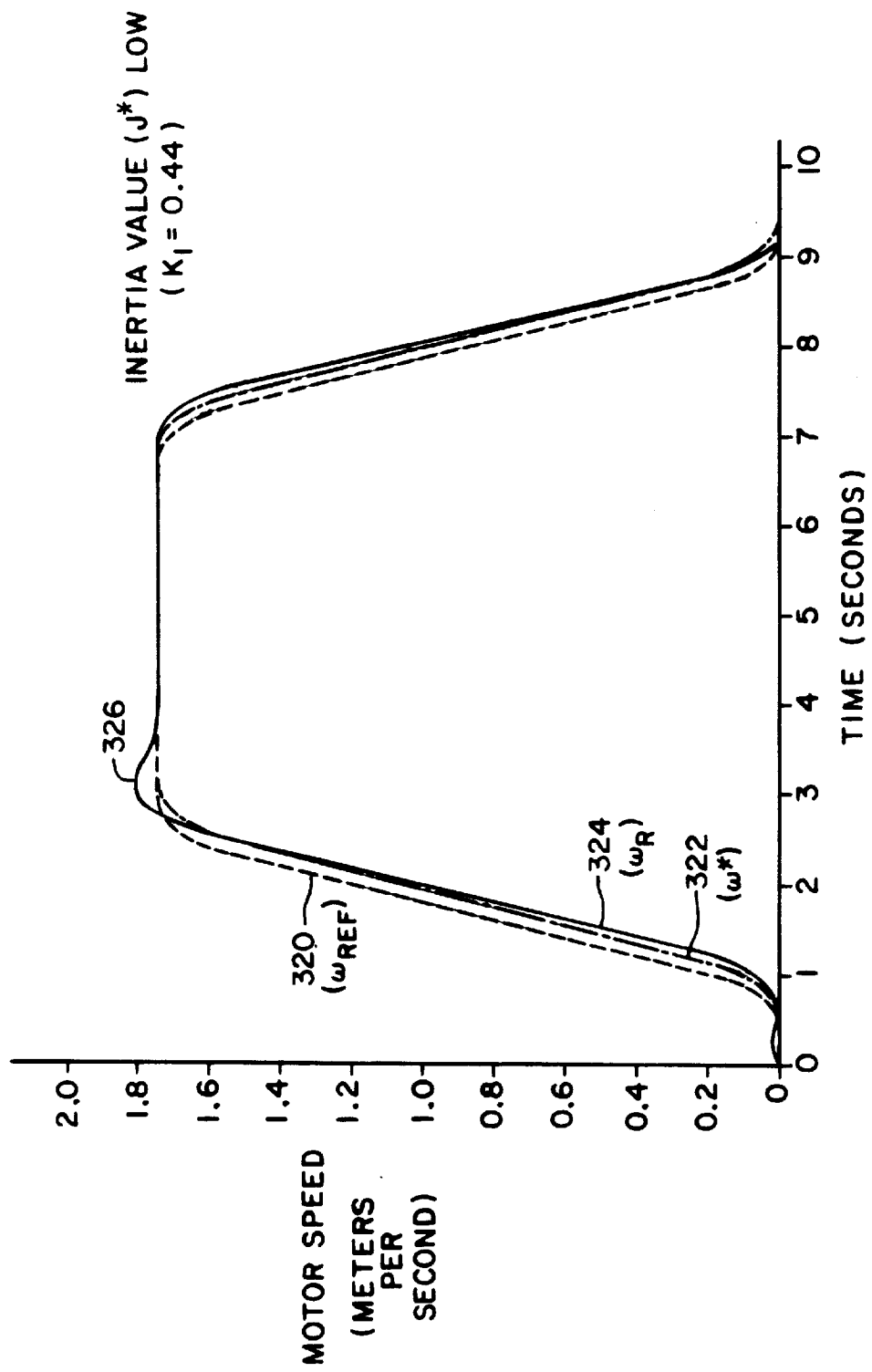
FIG. 8 is a graph of three motor speed parameters versus time when the inner loop gain estimate is low, in accordance with the present invention.
Figure 9:
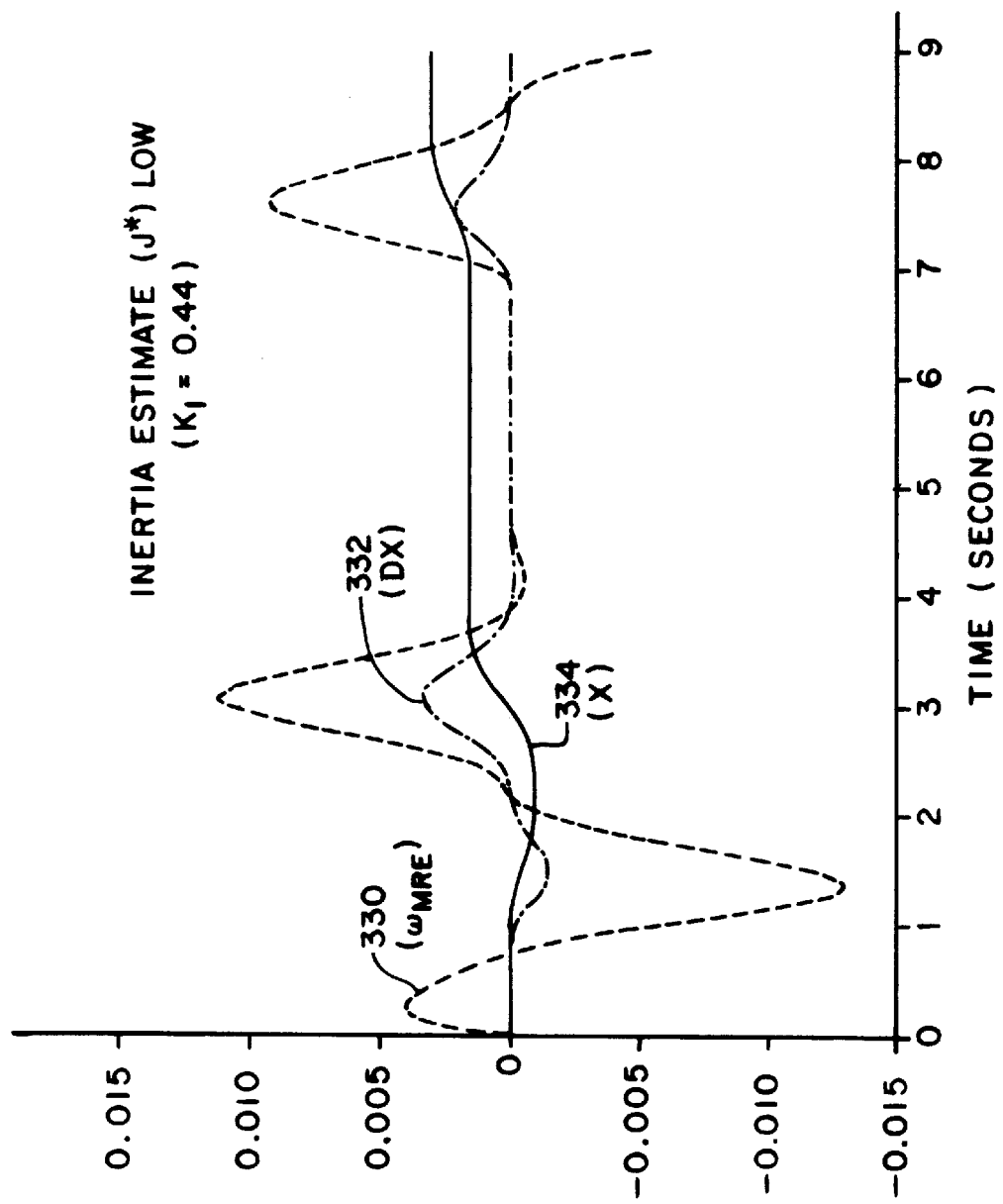
FIG. 9 is a graph of three parameters in the auto-calibration logic of FIG. 5 versus time when the inner loop gain estimate is low, in accordance with the present invention.

Referring now to FIGS. 8 and 9, the inertia value J* is a low value of 1.0 and, thus, K1 equals 0.44. The parameter $\omega_{REF}$ is shown by a curve 320, W* is shown by a curve 322 and $\omega_R$ is shown by a curve 324. In this case, with the inertia lower than the ideal case, the $\omega_R$ curve 324 exhibits an overshoot as indicated by a peak 326. Referring to FIG. 9, the parameter $W_{MRE}$ is indicated by a curve 330, the parameter DX is indicated by a curve 332, and the parameter X is indicated by a curve 334. In that case, with the inertial estimate low, the resultant value of X at the end of a single elevator run is positive.

Figure 10:
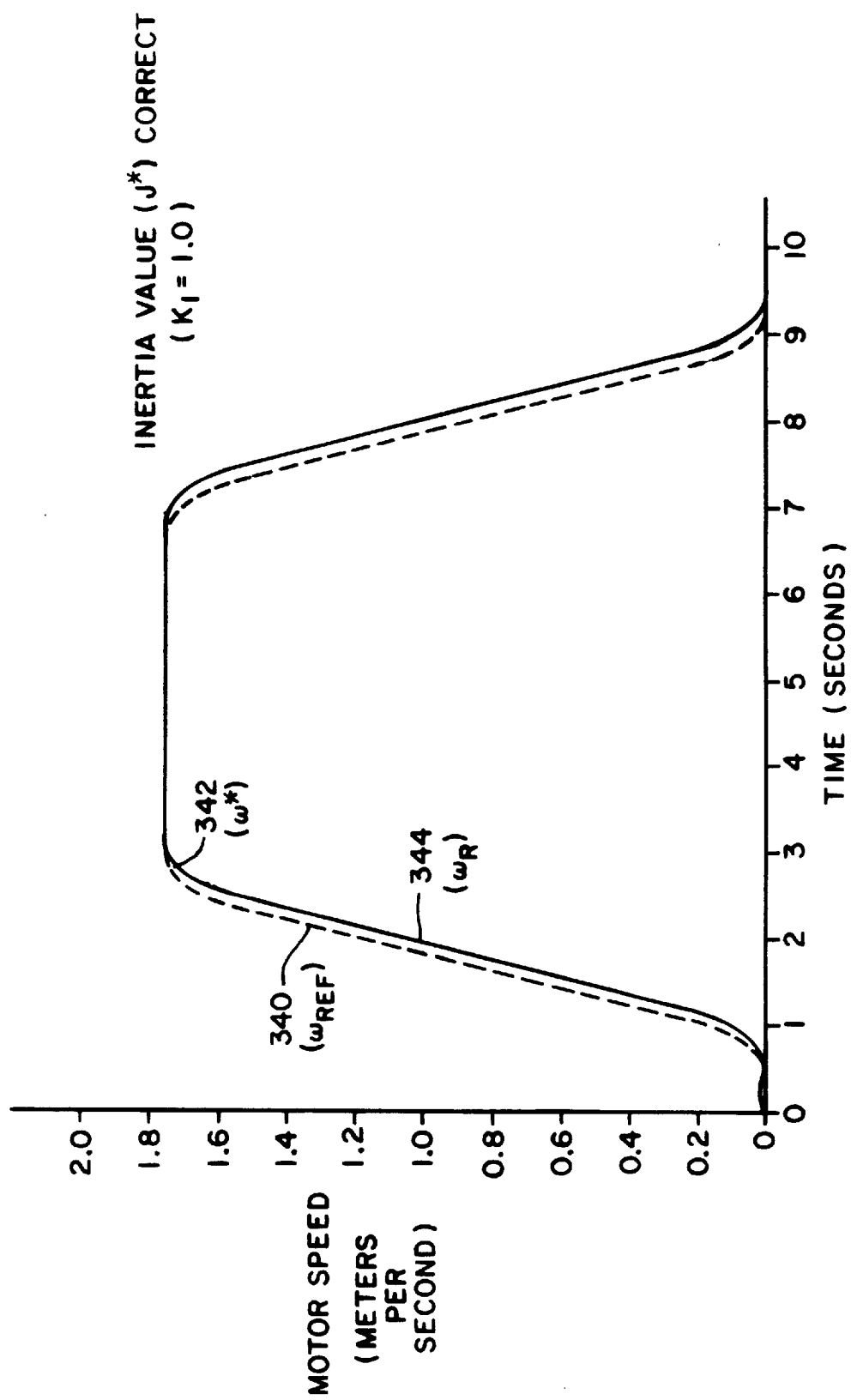
FIG. 10 is a graph of three motor speed parameters versus time when the inner loop gain estimate is correct, in accordance with the present invention.
Figure 11:
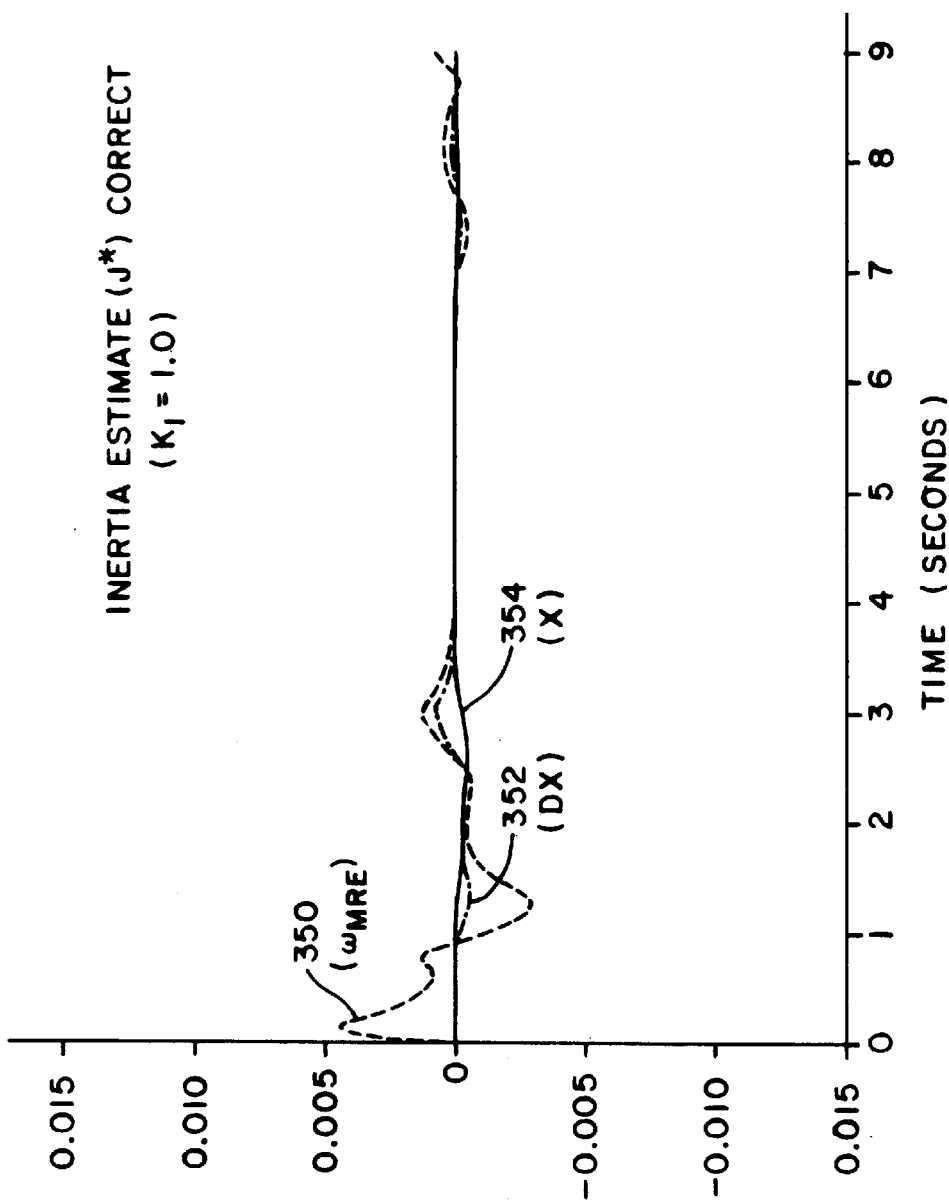
FIG. 11 is a graph of three parameters in the auto-calibration logic of FIG. 5 versus time when the inner loop gain estimate is correct, in accordance with the present invention.

Referring now to FIGS. 10 and 11, where the inertia value J* is correct (i.e., K1=1.0, J*=2.26), the parameter $\omega_{REF}$ is indicated by a curve 340, the parameter W* is indicated by a curve 342, and the parameter $\omega_R$ is indicated by a curve 344. As expected, the feedback signal $\omega_R$ is substantially equal to the desired signal W* with minimal overshoot or undershoot. Referring to FIG. 11, parameter $W_{MRE}$ is indicated by a curve 350, the parameter DX is indicated by a curve 352 and the parameter X is indicated by a curve 354. As expected, the parameter X is close to zero at the end of an elevator run indicating that the error between the desired speed output and the actual speed output is small and is within the desired tolerance.

Referring to FIG. 1, the multiplier 57 provides speed scaling or windowing of the error signal $W_{MRE}$ to the integrator 65, such that at low speeds, i.e., during ramp up and ramp down regions of the speed profile, the signal error $W_{MRE}$ is scaled down. Such scaling is done because the model logic 50 does not account for the load torque on the elevator system which comprises friction and hoistway imbalance and will in general be difficult to quantify. The friction will be non-linear, particularly for geared elevator systems and gearbox friction will be higher at low speeds, and gradually reducing to the lowest values as the speed reaches full speed.

Also, the multiplier 59 provides a windowing dead-band function which forces the integrator 65 to ignore model reference errors at low speeds by forcing DX to zero until the speed exceeds a predetermined percentage of the full speed. The comparator 63 uses a value of 50% of the full speed of the system as the width of the dead-band; however, other values may be used.

While the multipliers 57, 59 are not required for the present invention, they provide optimal performance. Also, instead of using both the multipliers 57, 59 to scale and window the input signal DX to the integrator 65, either one may be used individually if desired to provide a similar effect. Also, other windowing or signal scaling techniques may be used to avoid erroneous signals.

The term "loop gain" as used herein refers to the parameter (or factor) J* of the gain of the inner speed loop 122 (FIG. 2) within the speed loop compensation 16, which is varied as described herein, as well as the overall loop gain (e.g., $\omega_C J^*/K_T^*$). The other factors $\omega_C$, $K_T^*$ of the speed loop are constants, and as such, variation of J* results in variation of the speed loop gain. Also, it should be understood that instead of providing a variable J* and a constant $K_T^*$, the logic 66 may provide a single variable parameter equal to a combination of loop gain factors (e.g., $J^*/K_T^*$) or equal to the overall loop gain (e.g., $\omega_C J^*/K_T^*$) to the logic 16. In either case, the value of the loop gain is varied as described herein until the desired response is achieved.

Instead of the integrator 65, a low pass filter or any other type of filter may be used to filter transients in DX and provide an average value of DX over a given run. In that case, the output of the filter 65 may be sampled by the logic 66 prior to Pass or $\omega_R$ going to zero, e.g., during the constant or duty speed portion of the run. Also, the multipliers 57, 59 may be modified to operate with the filter chosen, to provide the desired output signals.

Alternatively, instead of using the integrator (or filter) 65, the signal DX may be sampled directly by the logic 66 without a filter or integrator. In that case, the logic 66 would sample the value of DX at the end of (or during) the constant speed portion of the run in steps 218, 226 (FIG. 5) and DX would replace X where ever it is referenced herein. Alternatively, instead or in addition to filtering DX, the input signals to the calculation of DX may be filtered. Alternatively, the logic 48 may calculate DX only when the motor speed is above a certain speed or has been at duty speed for a predetermined period of time.

The order of direction for the up-down elevator is run is not critical to the present invention, e.g., the elevator may be run down in the step 210 and up in the step 220 (FIG. 5). However, typically, service personnel will run the elevator to the ground or first floor to begin service or calibration. In that case, running the elevator up first may be necessary to provide a run which has a long enough duration, as discussed hereinbefore with the standard profile.

Although the invention has been described and illustrated with respect to exemplary embodiments thereof, it should be understood by those skilled in the art that the foregoing, and various other changes, omissions and additions may be made without departing from the spirit and scope of the present invention.

What is claimed is:

1. A method for calculating a motor speed loop gain of an elevator motor controller, comprising the steps of:
   a) setting the loop gain to an initial value;
   b) running the elevator in a first direction;
   c) calculating a model motor speed (W*);
   d) calculating a model reference error ($W_{MRE}$) as the difference between the model speed (W*) and an actual motor speed ($\omega_R$);

e) running the elevator in a second direction, opposite to said first direction;

f) performing steps (c)–(e) during the elevator run in said second direction;

g) computing an average value of $W_{MRE}$ for the elevator runs in said first and second directions as $X_{AVG}$; and h) varying $J^*$, performing steps (b)–(g), and determining the value of $J^*$ at which $X_{AVG}$ equals zero within a predetermined tolerance.

2. The method of claim 1, wherein said step of varying (h), comprises:

i) varying $J^*$ until $X_{AVG}$ changes sign; and j) performing a search algorithm to determine the value of $J^*$ at which $X_{AVG}$ crosses through zero, within a predetermined tolerance.

3. The method of claim 2 wherein said search algorithm comprises interpolating between the values of $J^*$ and $X_{AVG}$ for current and previous elevator runs.

4. The method of claim 1, wherein said step (d) further comprises filtering $W_{MRE}$ with a filter during the elevator run.

5. The method of claim 4 wherein said filter comprises an integrator.

6. The method of claim 1, wherein said step (d) further comprises adjusting the value of $W_{MRE}$ during the elevator run such that $W_{MRE}$ is a low value until the motor reaches a predetermined speed.

7. The method of claim 1, wherein said step (d) further comprises computing $W_{MRE}$ only when the motor reaches a predetermined speed for a predetermined period of time.

* * * * *